United States Patent [19]

Yamazaki et al.

[11] Patent Number: 4,967,364
[45] Date of Patent: Oct. 30, 1990

[54] ARBITRARY-DIRECTION TRACER CONTROL SYSTEM

[75] Inventors: Etuo Yamazaki; Hitoshi Matsuura, both of Hachioji, Japan

[73] Assignee: Fanuc Ltd., Minamitsuru, Japan

[21] Appl. No.: 453,260

[22] Filed: Dec. 21, 1989

Related U.S. Application Data

[63] Continuation of Ser. No. 377,736, Jul. 10, 1989, abandoned, which is a continuation of Ser. No. 46,982 filed as PCT JP86/00403 on Aug. 6, 1986, published as WO87/00784 on Feb. 12, 1987, abandoned.

[30] Foreign Application Priority Data

Aug. 7, 1985 [JP] Japan .................................. 60-173889

[51] Int. Cl.$^5$ ............................................ G05B 19/36
[52] U.S. Cl. ................................ 364/474.03; 33/1 M; 318/578
[58] Field of Search .................. 364/474.03, 474.05, 364/474.37; 33/1 M, 503–505; 318/578

[56] References Cited

U.S. PATENT DOCUMENTS

| | | | |
|---|---|---|---|
| 3,983,374 | 9/1976 | Sorensen, III et al. | 364/474 |
| 4,334,272 | 6/1982 | Imazeki et al. | 304/474 |
| 4,370,722 | 1/1983 | Imazeki et al. | 364/474 |
| 4,491,906 | 1/1985 | Kishi et al. | 364/167 |
| 4,534,685 | 8/1985 | Komiya et al. | 364/474 |
| 4,603,285 | 7/1986 | Matsuura et al. | 318/578 |
| 4,703,239 | 10/1987 | Yamazaki et al. | 318/578 |
| 4,709,482 | 12/1987 | Matsuura et al. | 33/1 M |

Primary Examiner—Allen MacDonald
Attorney, Agent, or Firm—Staas & Halsey

[57] ABSTRACT

An arbitrary-direction tracer control system moves a model and a tracer head relative to each other at an arbitrary angle to a reference axis X along lines passing through a reference point K, first and second tracing stroke limits L1 and L2 are set at which tracing feed is returned, so that tracing feed is along radial lines a - b, c - d, e - f and f - g extending from the reference ponts K, and pick feed operations are carried out by predetermined amounts b - c and f - g at the tracing stroke limits L1 and L2. As a result, tracing feed can always be performed in a direction perpendicular to a curved surface of the model, ensuring accurate tracing of the curved surface.

8 Claims, 6 Drawing Sheets

ARBITRARY-DIRECTION TRACER CONTROL SYSTEM

This is a continuation of copending application Ser. No. 07/377,736, now abandoned, filed on Jul. 10, 1989 which was a continuation of co-pending application Ser. No. 07/046,982 filed as PCT JP86/00403 on Aug. 6, 1986, published as WO87/00784 on Feb. 12, 1987, now abandoned.

TECHNICAL FIELD

The present invention relates to improvement in or relating to an arbitrary-direction tracer control system which permits free setting of the direction in which a tracer head and a model are fed relative to each other, and more particularly to an arbitrary-direction tracer control system which enables highly accurate tracing of a model with a curved surface.

BACKGROUND ART

Heretofore there has been proposed an arbitrary-direction tracer control system which makes it possible to feed a tracer head and a model relative to each other at an arbitrary angle to the X- or Y-axis (Pat. Appln. No. 14098/79). By such setting of the direction of feed at an arbitrary angle to the X- or Y-axis, even four corners of a square model could be traced with high accuracy.

Figure 8A:
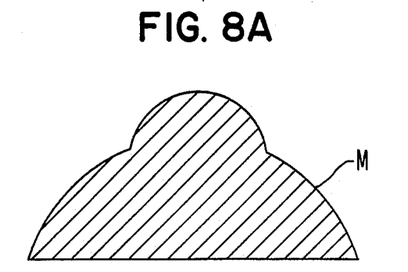
FIGS. 8A and 8B are top and side views of a prior art tracing method.
Figure 8B:
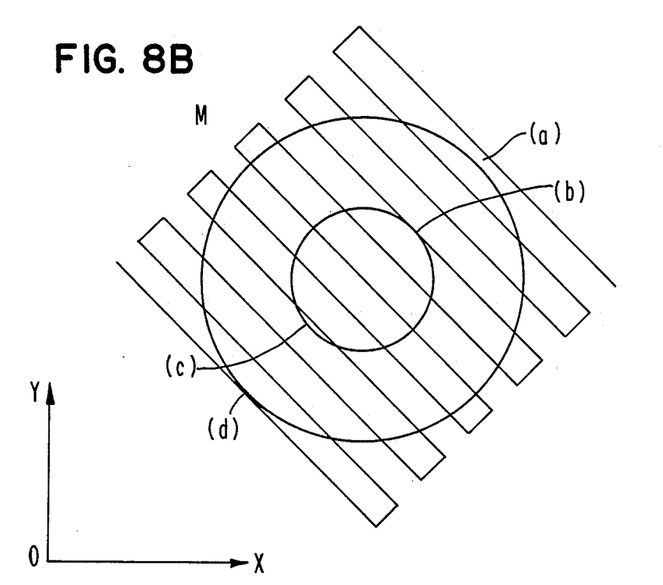

Even with the arbitray-direction tracer control system, however, there are cases where models cannot be traced with high accuracy according to their configurations. For example, assuming that a model M, whose cross-sectional and top plan views are shown in FIGS. 8A and 8B, is traced along a path depicted in FIG. 8B, portions (a) to (b) and (c) to (d) of the model M where the angle between its curved surfaces and the path is small cannot be traced with high accuracy because the tracer head yields small displacement signals in these portions.

DISCLOSURE OF THE INVENTION

The present invention offers a solution to the above-noted problem and has for its object to permit highly accurate tracing of a model with curved surfaces.

To solve the above-mentioned problem, the arbitrary-direction tracer control system of the present invention, which moves the model and the tracer head relative to each other at an arbitrary angle to the X-axis, comprises: input means for inputting the coordinate value of a reference point; setting means for setting first and second tracing stroke limits where the tracing stroke is returned; and control means for controlling the relative movement of the model and the tracer head. The control means has an arrangement whereby the tracer head is moved from the first tracing stroke limit to the second tracing stroke limit along a first path which passes through the reference point and has a first angle to the X-axis., when the tracer head reaches the second tracing stroke limit, a predetermined amount of pick feed is carried out; upon completion of the pick feed, the tracer head is moved to the first tracing stroke limit along a second path Joining the current position of the tracer head and the reference point; and when the tracer head reaches the first tracing stroke limit, it is moved along a third path which passes through the reference point and has a predetermined angle to the first path.

In the case of tracing a model with a curved surface, for instance, a hemispherical model, the coordinate value of the center of the model is input as the coordinate value of the reference point using the input means, the first tracing stroke limit is set as the reference point by the setting means, and the second tracing stroke limit is set to be a curve surrounding to the perimeter of the model. This ensures that tracing feed is always performed at right angles to the curved surface of the model, enabling the curved surface to be traced with a high degree of accuracy.

DESCRIPTION OF THE PREFERRED EMBODIMENT

Figure 1:
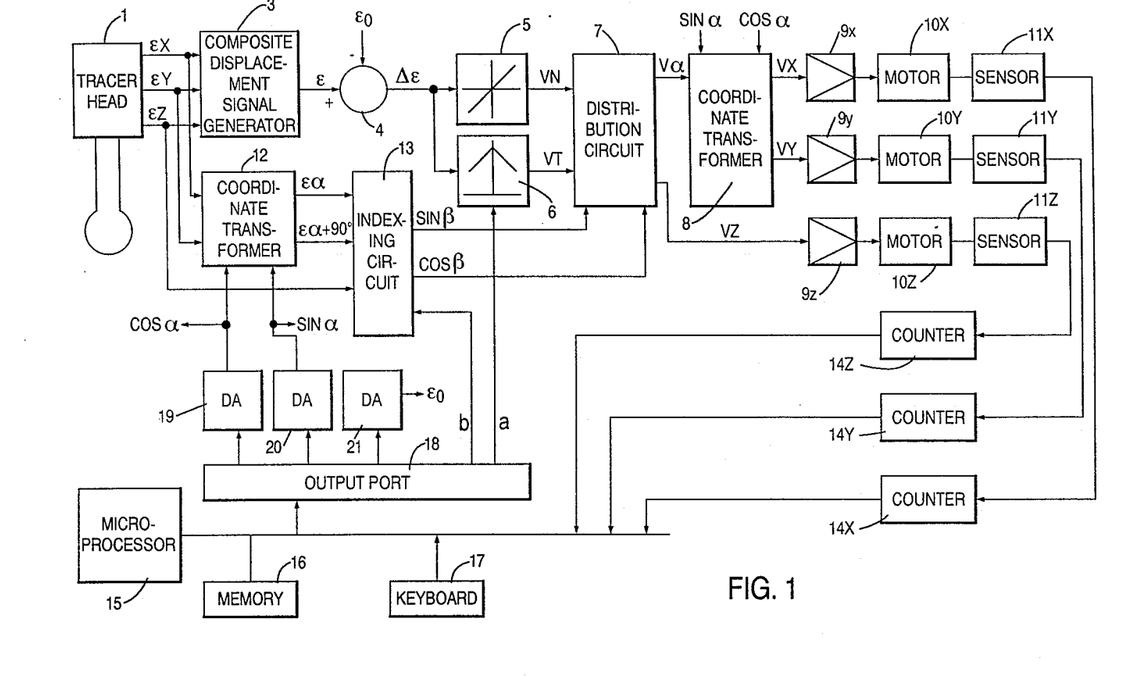
FIG. 1 is a block diagram of a tracer controller embodying the present invention.

FIG. 1 is a block diagram illustrating the arrangement of a tracer controller embodying the present invention. Reference numeral 1 indicates a tracer head, 2 a stylus, 3 a composite displacement signal generator, 4 an adder, 5 and 6 velocity signal generator, for generating normal-direction and tangential-direction velocity signals $V_N$ and $V_T$, respectively. Reference numberal 7 indicates a distribution circuit, 8 and 12 coordinate transformers, 9X to 9Z X- to Z-axis servo drive circuits, 10X to 10Z X to Z-axis motors, 11X to 11Z X- to Z axis position sensors, 13 an indexing circuit, 14X to 14Z counters, 15 a microprocessor, 16 a memory, 7 a keyboard, 18 an output port, and 19 to 21 DA converters. The velocity signal generator 6 yields the tangential-direction velocity signal $V_T$ with a + sign − or depending upon whether a signal a which is applied thereto via the output port 18 is "high" or "low". That is, the tracer feed direction can be changed 180 degrees depending upon whether the signal a is made "high" or "low".

Displacement signals $\epsilon_x$, $\epsilon_y$ and $\epsilon_z$ from the tracer head 1 are provided to the composite displacement sIgnal generator 3, from which the displacement signals $\epsilon_x$ and $\epsilon_y$ are applied to the coordinate transformer 12 and the displacement signal $\epsilon_z$ is applied to the indexing circuit 13. The composite displacement signal generator 3 produces a composite displacement signal, $\Delta = \sqrt{\epsilon_x^2 + \epsilon_y^2 + \epsilon_z^2}$, which is provided to the adder 4. The adder 4 obtains the difference, $\Delta\epsilon = \epsilon - \epsilon_0$, between the composite displacement signal e and a reference displacement signal $\epsilon_0$ which is applied thereto via the DA converter 21 from the microprocessor 15, the difference $\Delta\epsilon$ being provided to the velocity signal generators 5 and 6. The velocity signal generator 5 produces the normal-direction velocity signal $V_N$ on the basis of the difference $\Delta\epsilon$, and the velocity signal generator 6 produces the tangential-direction velocity signal $V_T$ on the bases of the difference $\Delta\epsilon$ and the signal a. The coordinate transformer 12 creates signals $\epsilon_\alpha$ and $\epsilon_{60+90°}$ given by the following expressions (1) and (2), on the bases of the displacement signals $a_x$ and $\epsilon_y$ from the tracer head 1 and signals $\cos\alpha$ and $\sin\alpha$ which are applied from the microprocessor 15 via the DA converters 19 and 20, respectively.

$$\epsilon_\alpha = \epsilon_x \cos\alpha + \epsilon_y \sin\alpha \quad (1)$$

$$\epsilon_{\alpha+90°} = \epsilon_y \cos\alpha - \epsilon_x \sin\alpha \quad (2)$$

$$= \epsilon_x \cos(\alpha + 90°) + \epsilon_y \sin(\alpha + 90°)$$

In the above $\alpha$ is the angle between the tracer feed direction and the X-axis. For example, a coordinate transformer 22 set forth in Japanese Pat. Appln. No. 14098/79 can be employed as the coordinate transformer 22.

When a signal b is applied the indexing circuit 13 via the output. port 18 from the microprocessor 15 is "high", the indexing circuit 13 indexes an angle of displacement $\beta$ in a plane containing an axis which forms an angle $\alpha$ with the X-axis and the Z-axis, on the bases of the displacement signal $\epsilon_z$ from the tracer head 1 and the signal $\epsilon_\alpha$ from the coordinate transformer 12, and yields a cosine signal $\cos\beta$ and a sine signal $\sin\beta$ in the direction of displacement which are given by the following expressions (3) and (4). When the signal b is "low", the indexing circuit 13 indexes the angle of displacement $\beta$ in a plane containing an axis which forms an angle $(\alpha+90°)$ with the X-axis and the Z axis, on the bases of the displace signal $\epsilon_z$ and the signal $\epsilon_{\alpha+90°}$ from the coordinate transformer 12, and yields a cosine signal $\cos\beta$ and a sine signal $\sin\beta$ which are given by the following expressions (5) and (6).

$$\cos = \epsilon_\alpha \div (\epsilon_\alpha 2 + \epsilon_z 2) \quad (3)$$

$$\sin = \epsilon_z 2 \div (\epsilon_\alpha 2 = \epsilon_z 2) \quad (4)$$

$$\cos = \epsilon_{\alpha+90°} 2 \div (\epsilon_{\alpha+90°} 2 + \epsilon_z 2) \quad (5)$$

$$\sin = \epsilon_z 2 \div (\epsilon_{\alpha+90°} 2 + \epsilon_z 2) \quad (6)$$

The distribution circuit 7 creates a velocity signal $V_{60}$ in the tracer feed direction and a velocity signal $V_z$ in the Z-axis direction on the bases of the velocity signals $V_N$ and $V_T$ from the velocity signal generators 5 and 6 and the output signals $\cos\beta$ and $\sin\beta$ from the indexing circuit 13. The velocity signal $V_z$ in the Z-axis direction is applied to the servo drive circuit 9Z, the output of which drives the motor 10Z. The velocity signal $V_\alpha$ in the tracer feed direction is applied to the coordinate transformer 8, which in turn produces velocity signals $V_x = V_{60} \cdot \cos\alpha$ and $V_y = V_\alpha \cdot \sin\alpha$ the X- and Y-axis directions. The velocity signals $V_x$ and $V_y$ in the X- and Y-axis directions are provided to the servo drive circuits 9X and 9Y, the output signals from which drive the motors 10X and 10Y, feeding the tracer in the tracer feed direction. The coordinate transofrmer disclosed in Japanese Pat. Appln. No. 14098/79 can be employed as the coordinate transformere 8.

The position sensors 11X to 11Z yield a positive (+) pulse each time the motors 10X to 10Z rotate through a predetermined angle in the forward direction, and yield a negative (−) pulse each time the motors 10X to 10Z rotate through a predetermined angle in the backward direction. The counters 14X to 14Z are each incremented by one upon each application of the () pluse and decremented by one upon each application of the (-)pulse. In short, the count values of the counters 14X to 14Z indicate the X-, Y- and Z-coordinates of the current position of the tracer head 1, respectively.

Figure 2:
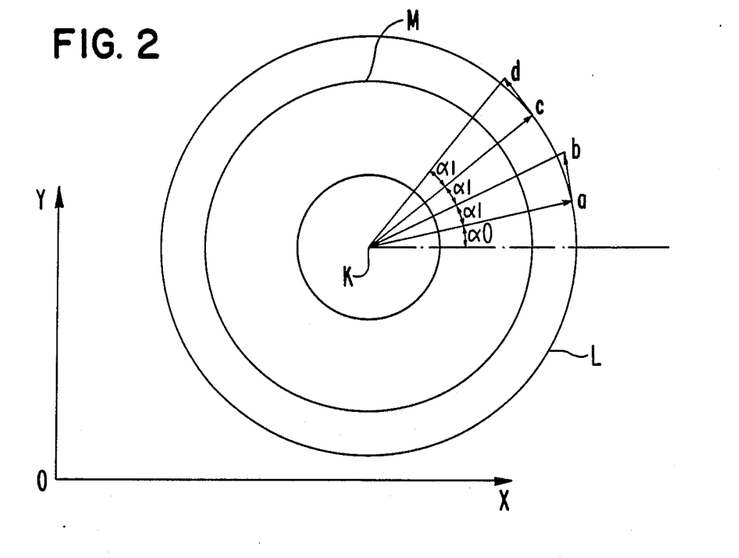
FIGS. 2, 4, 6 and 7 are plan views showing tracing paths in different embodiments of the present invention.
Figure 3:
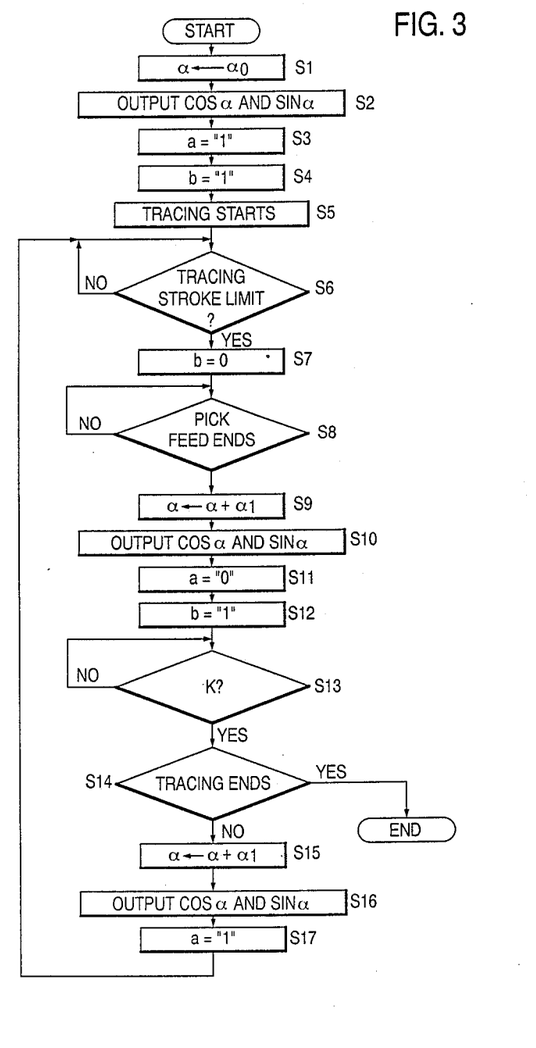
FIGS. 3 and 5 are flowcharts of processing in microprocessor 15 in FIG. 1.

FIG. 2 is a plan view showing the tracing path along which was traced a model M having the same shape as the model M depicted in FIGS. 8A and 8B. In FIG. 2, reference character L indicates a tracing stroke limit where the tracing stroke is returned, and K a reference point (which is the center of curvature of the model M, in this case) the coordinate value of which is input from the keyboard 17 in advance. The tracing stroke limit L is set by, for instance, attaching a potential wire on the model surface, or inputting from the keyboard 17 an equation corresponding to the tracing stroke limit L. FIG. 3 is a flowchart showing the processing preformed by the microprocessor 15 in the following the cutting path depicted in FIG. 2. The tracing operation will hereinbelow be described with reference to FIG. 3.

When directed to start its processing, the microprocessor 15 first applies the signals $\cos\alpha_0$ and $\sin\alpha_0$ to the coordinate transformers 8 and 12 via the DA converters 19 and 20 (steps S1 and S2). Here, $\alpha_0$ is the angle between the tracer feed direction and the X-axis, which angle is calculated from the coordinate values of the current position of the tracer head 1 and the reference point K and is prestored in the memory 16. Next, the microprocessor 15 provides a control signal to the output port 18 to make its output signals a and b "high" (steps S3 and S4) and then starts tracing (step S5). In this way, tracing along a path K–a is initiated.

When it is detected from the count values of the counters 14X and 14Y that the tracer head 1 has reached the tracing stroke limit L (step S6), the microprocessor 15 applied a control signal to the output port 18 to make its output signal b "low" (step S7). By this, the tracer feed direction is changed 90 degrees, and then a pick feed is carried out along a path a–b. When it is detected from the count values of the counters 14X and 14Y that the pick feed has been effected by a predetermined amount (a predetermined angle $\alpha_1$, for instance) (step S8), the microprocessor 15 outputs signals $\cos(\alpha_0+\alpha_1)$ and $\sin(\alpha_0+\alpha_1)$ (step S10) and then provides a control signal to the output port 18 to make its output signals a and b "low" and "high", respectively (steps S11 and S12). By this, tracing along a path b–K is performed.

Then, when it is detected from the count values of the counters 14X and 14Y that the tracer head 1 has reached the reference point K (the center of curvature of the model M, in this instance), the microprocessor decides whether the tracing has ended or not (step S14). In this case, since the result of decision in step S14 is "NO", the microprocessor 15 outputs signals $\cos(\alpha_0+2\alpha_1)$ and $\sin(\alpha_0+2\alpha_1)$ (steps S15 and S16) and then applies a control signal to the output port 18, making its output signal a "high". As a result of this, tracing is carried out along a path K–c. Thereafter, the microprocessor 15 repeats the processing of each of steps S6 to S17 until the tracing has been completed.

As described above, this embodiment ensures tracing in the direction perpendicular to the curved surface of the model M at all times, and hence permits highly accurate tracing of the model M.

Figure 4:
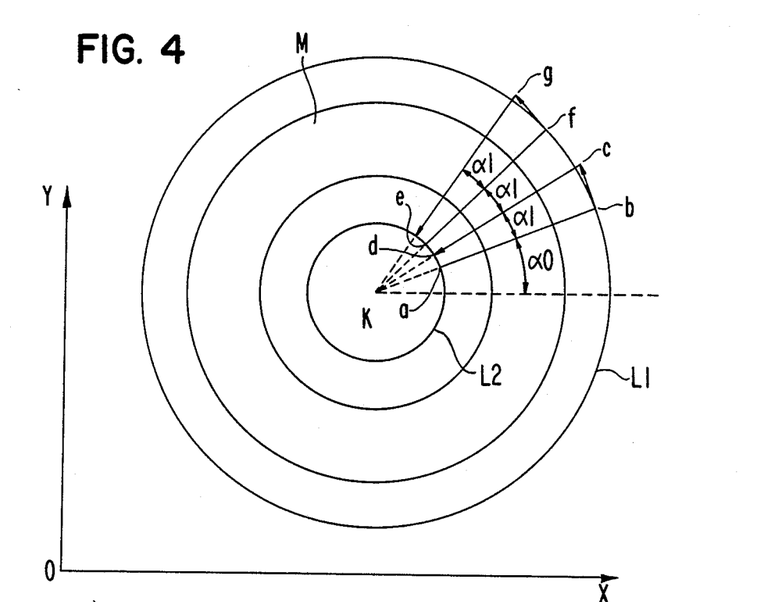
Figure 5:
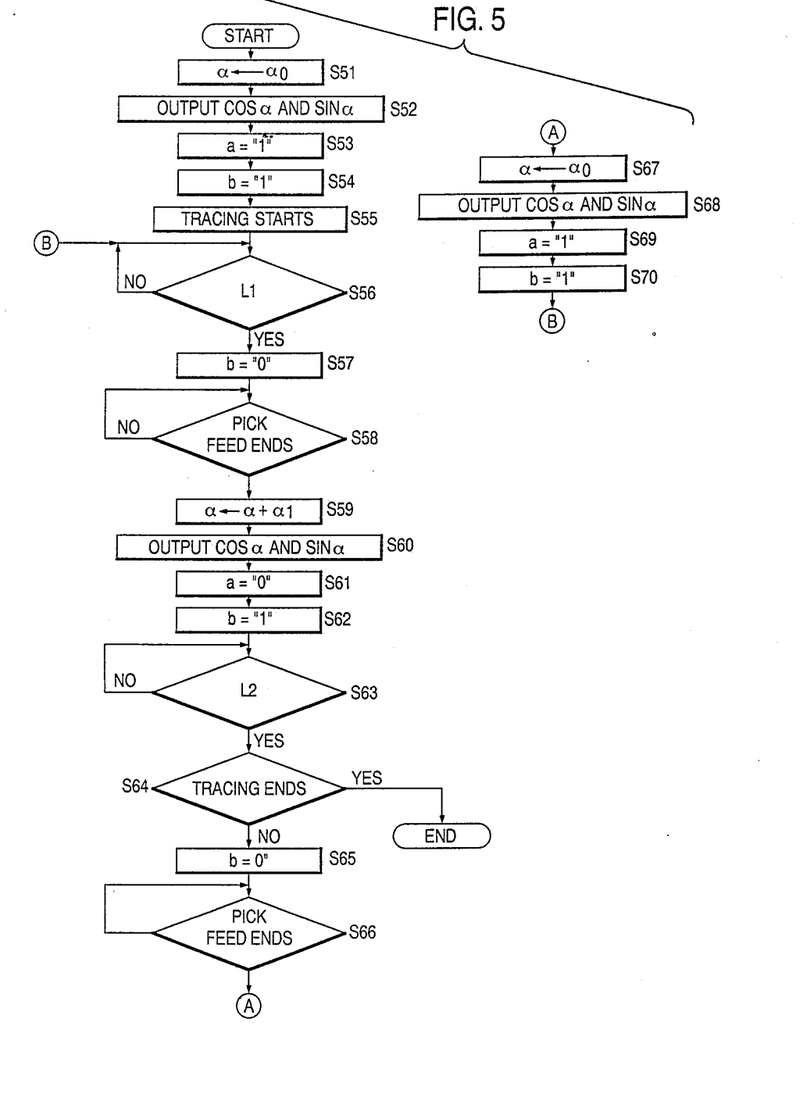

FIG. 4 is a plan view showing the path for tracing a doughnutshaped model M according to the system of the present invention. In FIG. 4, reference characters L1 and L2 indicate tracing stroke limits where the tracing stroke is returned, and K a reference point (the center of curvature of the model M, in this case). FIG. 5 is a flowchart showing the processing in the microprocessor 15 in this instance. The tracing operation will hereinbelow be described with reference to FIG. 5.

When directed to start its processing, the microprocessor 15 applies the signals $\cos\alpha_0$ and $\sin\alpha_0$ to the coordinate transformers 8 and 12 via the DA converters 19 and 20 (steps S51 and S52) and provides a control signal to the outpout port 18 to make its output signals a and b "high" (steps S53 and S54), thereafter initiating the tracing (step S55). Thus, the tracing is performed along a path a–b.

When it is detected from the count values of the counters 14X and 14Y that the tracer head 1 has reached the tracing stroke limit L1 (step S56), the microprocessor 15 provides a control signal to the output port 18 to make its output signal b "low" (step S57). By this, a pick feed is carried out along a path b–c.

When it is detected from the count values of the counters 14X and 14Y that the pick feed has been effected by a predetermined amount (a predetermined angle $\alpha_1$ in this case) (step S58), the microprocessor 15 yields the signals $\cos(\alpha_0+\alpha_1)$ and $\sin(\alpha_0+\alpha_1)$ (steps S59 and S60) and applies a control signal to the output port 18, making its output signals a and b "low" and "high", respectively (steps S61 and S62). Then the tracing is performed along a path c–d.

When it is detected from the count values of the counters 14X and 14Y that the tracer head 1 has reached the tracing stroke limit L2 (step S63), the microprocessor 15 decides whether the tracing has been completed or not (step S64). In this instance, since the result of decision in step S64 is "NO", the microprocessor 15 provides a control signal to the output port 18 to make its output signal b "low". As a result of this, a pick feed takes place along a path d–e. When it is detected from the count values of the counters 14X and 14Y that the pick feed has been carried out by a predetermined amount (the predetermiend angle $\alpha_1$ in this case) (step S66), the mircorprocessor 15 yields the signals $\cos(\alpha_0+2\alpha_1)$ and $\sin(\alpha_0+2\alpha_1)$ (steps S67 and S68) and applies a control signal to the output port 18 to make its output signals a and b "high" (steps S69 and S70). In consequence, the tracing is performed along a path e–f. Following this, the microprocessor 15 repeats the processing of each of stebs S56 to S70 until the tracing has been completed.

As described above, according to this embodiment, the tracing of the model M can always take place in a direction perpendicular to its curved surface, and hence is highly accurate.

Figure 6:
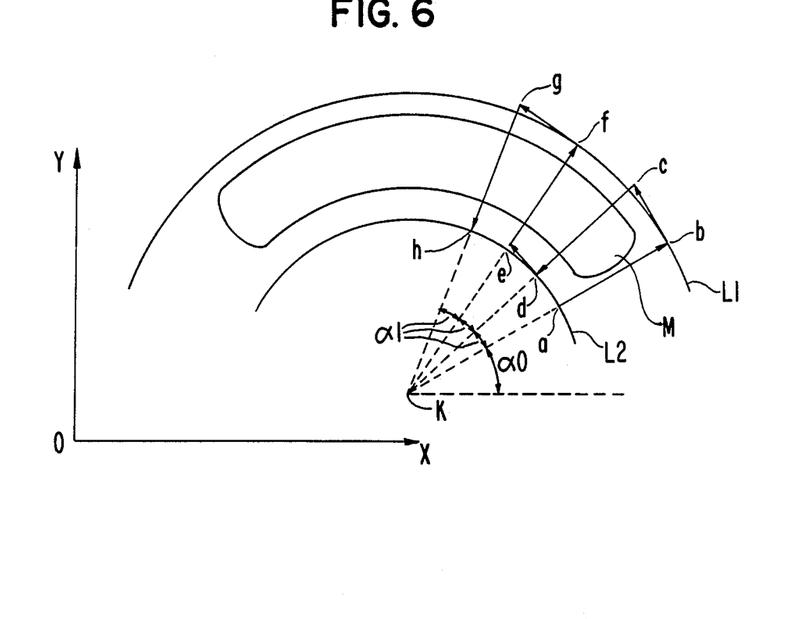

Also in the case of tracing a model M of such a con figuratlon as shown in FIG. 6, the tracing feed can always be held perpendicular to the curved surface of the model M by setting the tracing stroke limits La and L2 and the reference point K and executing the processes shown in the flow chart of FIG. 5.

Figure 7:
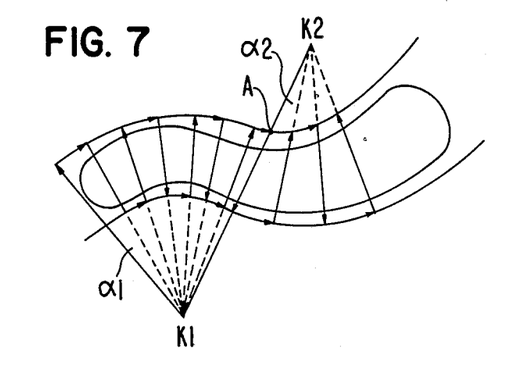

Furthermore, a model M whose curved surface meanders in the X–Y plane as shown in FIG. 7 can also be traced continuously and accurately, by prestoring first and second reference points K1 and K2 and first and second incremental angles $\alpha_1$ and $\alpha_2$ in the memory 16 and switching between the reference points and between the incremental angles at the bending point A.

While in the abovedescribed embodiments the pick feed is performed in terms of a predetermiend angle, it may also be effected in terms of distance, of course.

As described above, according to the present invention, the tracing feed direction can always be held perpendicular to the curved surface of a model simply by setting a reference point (the center of curvature in the embodiments) and a tracing stroke limit, and accordingly, the model with the curved surface can be traced with a high degree of accuracy.

What is claimed is:

1. An arbitrary-direction tracer control system for controlling movement of a model and a tracer head relative to each other at an arbitrary angle to an X-axis, comprising:
    input means for inputting a coordinate value of a reference point;
    setting means for setting first and second tracing stroke limits where tracing feed is to be returned; and
    control means for controlling movement of the tracer head relative to the model from a first point at the first tracing stroke limit to a second point at the second tracing stroke limit along a first path which passes through the reference point and has a first angle to the X-axis, for controlling mvoement of the tracer head upon reaching the second tracing stroke limit to perform a first pick feed in a direction perpendicular to the first path until a third point is reached, for controlling, upon reaching the third point, movement of the tracer head to a fourth point at the first tracing stroke limit along a second path colinear with a line through the third point and the reference point and having a first predetermined angle to the direction of the first pick feed, for controlling movement of the tracer head upon reaching the first stroke limit to perform a second pick feed in a direction perpendicular to the second path until a fifth point is reached and for controlling, upon reaching the fifth point, movement of the tracer head to the second tracing stroke limit, along a third path colinear with a second line through the fifth point and the reference point and having a second predetermined angle to the direction of the second pick feed.

2. A method of controlling relative movment of a tracer head at an arbitrary angle to an X-anis of a model in an arbitrary-direction tracer control system, comprising the steps of:
    (a) setting an outer stroke limit outside the periphery of the model;
    (b) defining a reference point with respect to the model; and
    (c) controlling movement of the tracer head relative to the model along line segments of lines radiating from the reference point to the outer stroke limit to generate tracer signals defining the shape of the model.

3. a method as recited in claim 2,
    further comprising the step of (d) setting an inner stroke limit between the reference point and the outer stroke limit prior to performing said controlling in step (c), and
    wherein teh line segments extend between the inner stroke limit and the outer stroke limit.

4. A method as recited in claim 3, wherein said controlling in step (c) includes producing pick feed movement between adjacent line segments each time one of the inner and outer stroke limits is reached.

5. A method as recited in claim 4, wherein the adjacent line segments are equally spaced apart by an angular displacement.

6. A method as recited in claim 2, wherein said controlling in step (c) includes producing pick feed movement between the line segments each time the outer stroke limit is reached.

7. A method as recited in claim 2, further comprising the step of (d) repeating steps (a) to (c) for tracing operations on different portions of the model.

8. An arbitray direction tracer control system for controlling relative movement of a tracer head at an arbitrary angle to an X-axis of a model, comprising:

means for defining a reference point and an outer stroke limit with respect to the model; and means for controlling movement of the tracer head relative to the model along line segments of lines radiating from the reference point to the outer stroke limit to generate tracer signals defining the shape of the model.

* * * * *

UNITED STATES PATENT AND TRADEMARK OFFICE
CERTIFICATE OF CORRECTION

PATENT NO. : 4,967,364

DATED : October 30, 1990

INVENTOR(S) : Yamazaki et al.

It is certified that error appears in the above-identified patent and that said Letters Patent is hereby corrected as shown below:

ON THE TITLE PAGE:

[75], under "Inventors", "Hachioji" should be --Tokyo--;

[57], "Abstract", line 5, "K, first" should be --K. First--; and line 8, "ponts" should be --points--.

Col. 1, line 35, "M" should be --M,--;
line 37, "small" should be --small,--;
line 63, "Joining" should be --joining--.

Col. 2, line 7, delete "to";
line 29, "generator" should be --generators--;
line 34, "X" (first occurrence) should be --X- --;
"Z" (second occurrence) should be --Z- ---;
line 36, "7" should be --17--;
line 39, "+ sign — or" should be --sign + or — --;
line 46, "sIgnal" should be --signal--;
line 51, "$\Delta$" should be --$\epsilon$--;
line 63, "$\epsilon_{60}$ should be ---$\epsilon_\alpha$--;
line 65, "$\alpha_x$" should be --$\epsilon_x$--.

UNITED STATES PATENT AND TRADEMARK OFFICE
CERTIFICATE OF CORRECTION

PATENT NO. : 4,967,364

DATED : October 30, 1990

INVENTOR(S) : Yamazaki et al.

It is certified that error appears in the above-identified patent and that said Letters Patent is hereby corrected as shown below:

Col. 3, line 24, "displace" should be --displacement--;
line 37, "$V_{60}$" should be --$V_\alpha$--;
line 46, "$V_{60}.$" should be --$\alpha_{60} \cdot$ --;
". sinα" should be -- . sin α in--;
line 51, "transofrmer" should be --transformer--;
line 53, "transformere" should be --transformer--;
line 60, "()" should be --(+)--;
line 62, "(-)pulse" should be --(−) pulse--.

Col. 4, line 9, delete "the" (second occurrence).

Col. 5, line 49, "La" should be --L1--;
line 59, "abovedescribed" should be --above-described--.

Col. 6, line 51, "a" should be --A--.

Signed and Sealed this

Twenty-ninth Day of September, 1992

Attest:

DOUGLAS B. COMER

*Attesting Officer*        *Acting Commissioner of Patents and Trademarks*